United States Patent
Ayyapureddi

(10) Patent No.: US 12,524,298 B2
(45) Date of Patent: Jan. 13, 2026

(54) APPARATUSES AND METHODS FOR BOUNDED FAULT COMPLIANT METADATA STORAGE

(71) Applicant: MICRON TECHNOLOGY, INC., Boise, ID (US)

(72) Inventor: Sujeet Ayyapureddi, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/424,282

(22) Filed: Jan. 26, 2024

(65) Prior Publication Data

US 2024/0256380 A1 Aug. 1, 2024

Related U.S. Application Data

(60) Provisional application No. 63/482,480, filed on Jan. 31, 2023.

(51) Int. Cl.
*G06F 11/10* (2006.01)

(52) U.S. Cl.
CPC .............................. *G06F 11/1004* (2013.01)

(58) Field of Classification Search
CPC .... G06F 11/1004; G06F 11/14; G06F 11/108; G06F 11/1012
See application file for complete search history.

(56) References Cited

U.S. PATENT DOCUMENTS

| | | |
|---|---|---|
| 7,117,421 B1 | 10/2006 | Danilak |
| 9,158,617 B2 | 10/2015 | Cho et al. |
| 9,201,728 B2 | 12/2015 | Patapoutian et al. |
| 9,547,550 B1 | 1/2017 | Thakore et al. |
| 9,666,291 B2 | 5/2017 | Park |
| 9,880,901 B2 | 1/2018 | Zastrow |
| 10,127,101 B2 | 11/2018 | Halbert et al. |
| 10,222,989 B1 | 3/2019 | Zitlaw |
| 10,243,590 B1 | 3/2019 | Seshadri |
| 10,810,079 B2 | 10/2020 | Halbert et al. |

(Continued)

FOREIGN PATENT DOCUMENTS

| | | |
|---|---|---|
| WO | 2016048634 A1 | 3/2016 |
| WO | 2024107367 A1 | 5/2024 |

(Continued)

OTHER PUBLICATIONS

U.S. Appl. No. 18/625,539, titled "Apparatuses, Systems, and Methods for Per Row Error Scrub Information" filed Apr. 3, 2024, pp. all pages of application as filed.

(Continued)

*Primary Examiner* — Shelly A Chase
(74) *Attorney, Agent, or Firm* — Dorsey & Whitney LLP

(57) ABSTRACT

Apparatuses, systems, and methods for bounded fault compliant metadata storage. Memory devices include a first data terminal and a second data terminal. As part of an access operation a first set of data and a first set of metadata may be sent/received across the first terminal and a second set of data and a second set of metadata may be sent/received across the second terminal. The first set of metadata may be stored in a first location and the second set of metadata may be stored in a second location in the memory array, such as a first and second column plane. The two locations may be remote from each other.

20 Claims, 7 Drawing Sheets

(56) References Cited

U.S. PATENT DOCUMENTS

| | | |
|---|---|---|
| 10,817,371 B2 | 10/2020 | Rooney et al. |
| 10,872,011 B2 | 12/2020 | Bains et al. |
| 10,929,033 B2 | 2/2021 | Meeker et al. |
| 10,937,517 B1 | 3/2021 | Rich-Plotkin et al. |
| 11,010,304 B2 | 5/2021 | Kang et al. |
| 11,074,126 B2 | 7/2021 | Prather et al. |
| 11,088,710 B2 | 8/2021 | Lee et al. |
| 11,200,961 B1 | 12/2021 | Uribe |
| 11,264,085 B1 | 3/2022 | Ware et al. |
| 11,579,971 B2 | 2/2023 | Ayyapureddi |
| 11,580,038 B2 | 2/2023 | Norman et al. |
| 11,615,861 B2 | 3/2023 | Kim et al. |
| 12,001,707 B2 | 6/2024 | Boehm et al. |
| 12,014,797 B2 | 6/2024 | Ayyapureddi |
| 12,019,513 B2 | 6/2024 | Ayyapureddi |
| 12,204,410 B2 | 1/2025 | Sutera et al. |
| 12,204,770 B2 | 1/2025 | Ayyapureddi |
| 12,230,347 B2 | 2/2025 | Suh et al. |
| 2003/0081492 A1 | 5/2003 | Farrell et al. |
| 2006/0233030 A1 | 10/2006 | Choi |
| 2008/0089129 A1 | 4/2008 | Lee |
| 2008/0313493 A1 | 12/2008 | Roohparvar et al. |
| 2009/0097348 A1 | 4/2009 | Minzoni et al. |
| 2009/0132876 A1 | 5/2009 | Freking et al. |
| 2009/0168523 A1 | 7/2009 | Shirakawa et al. |
| 2009/0196103 A1 | 8/2009 | Kim et al. |
| 2010/0177582 A1 | 7/2010 | Kim et al. |
| 2010/0177587 A1 | 7/2010 | Huang |
| 2010/0290146 A1 | 11/2010 | Lam |
| 2011/0154158 A1 | 6/2011 | Yurzola et al. |
| 2013/0117630 A1 | 5/2013 | Kang |
| 2014/0126300 A1 | 5/2014 | Takahashi et al. |
| 2015/0193464 A1 | 7/2015 | Kwon et al. |
| 2015/0262631 A1 | 9/2015 | Shimizu |
| 2016/0070507 A1 | 3/2016 | Hoshikawa et al. |
| 2016/0092307 A1 | 3/2016 | Bonen et al. |
| 2016/0125920 A1 | 5/2016 | Kim et al. |
| 2016/0307645 A1 | 10/2016 | Kim et al. |
| 2017/0060681 A1 | 3/2017 | Halbert et al. |
| 2017/0062067 A1* | 3/2017 | Yang .................. G11C 29/76 |
| 2017/0091025 A1 | 3/2017 | Ahn et al. |
| 2017/0192843 A1 | 7/2017 | Warnes et al. |
| 2017/0249097 A1 | 8/2017 | Eguchi |
| 2017/0269992 A1 | 9/2017 | Bandic et al. |
| 2017/0285990 A1 | 10/2017 | Chen et al. |
| 2017/0286213 A1 | 10/2017 | Li |
| 2017/0344423 A1 | 11/2017 | Hsiao et al. |
| 2018/0025760 A1 | 1/2018 | Mazumder et al. |
| 2018/0121283 A1 | 5/2018 | Plants |
| 2018/0150350 A1 | 5/2018 | Cha et al. |
| 2019/0066816 A1 | 2/2019 | Dono |
| 2019/0103154 A1 | 4/2019 | Cox et al. |
| 2019/0197171 A1 | 6/2019 | Tiwari et al. |
| 2019/0206478 A1 | 7/2019 | Jun |
| 2019/0362792 A1* | 11/2019 | Oh .................. H10B 43/40 |
| 2019/0369893 A1 | 12/2019 | Ross |
| 2020/0019462 A1 | 1/2020 | Prather et al. |
| 2020/0051616 A1 | 2/2020 | Cho |
| 2020/0104205 A1 | 4/2020 | Noguchi et al. |
| 2020/0104208 A1 | 4/2020 | Heo et al. |
| 2020/0194050 A1 | 6/2020 | Akamatsu |
| 2020/0226039 A1 | 7/2020 | Lee |
| 2020/0373941 A1 | 11/2020 | Latorre et al. |
| 2021/0011645 A1 | 1/2021 | Martinelli et al. |
| 2021/0012817 A1 | 1/2021 | Laurent et al. |
| 2021/0012849 A1 | 1/2021 | Kim et al. |
| 2021/0057003 A1 | 2/2021 | Prather et al. |
| 2021/0064119 A1 | 3/2021 | Mirichigni et al. |
| 2021/0064282 A1 | 3/2021 | He et al. |
| 2021/0064461 A1 | 3/2021 | Veches |
| 2021/0064467 A1 | 3/2021 | Buerkle et al. |
| 2021/0083687 A1 | 3/2021 | Lee et al. |
| 2021/0142848 A1 | 5/2021 | Lim et al. |
| 2021/0142860 A1 | 5/2021 | Song et al. |
| 2021/0200630 A1 | 7/2021 | Ishikawa et al. |
| 2021/0208967 A1 | 7/2021 | Cha et al. |
| 2021/0224155 A1 | 7/2021 | Bains et al. |
| 2021/0247910 A1 | 8/2021 | Kim et al. |
| 2021/0272627 A1 | 9/2021 | Lee |
| 2021/0294692 A1 | 9/2021 | Chen |
| 2021/0311821 A1 | 10/2021 | Ryu et al. |
| 2021/0311822 A1 | 10/2021 | Jannusch et al. |
| 2021/0311830 A1 | 10/2021 | Lee |
| 2021/0357287 A1 | 11/2021 | Kim et al. |
| 2021/0358559 A1 | 11/2021 | Suh et al. |
| 2021/0365316 A1 | 11/2021 | Nale et al. |
| 2021/0406123 A1 | 12/2021 | Nakanishi et al. |
| 2022/0027090 A1* | 1/2022 | Kwon .................. G06F 3/0673 |
| 2022/0035529 A1 | 2/2022 | Bennett |
| 2022/0084565 A1 | 3/2022 | Prather et al. |
| 2022/0091938 A1 | 3/2022 | Buerkle et al. |
| 2022/0129196 A1 | 4/2022 | Roberts et al. |
| 2022/0138065 A1 | 5/2022 | Secatch et al. |
| 2022/0197739 A1 | 6/2022 | Ryu et al. |
| 2022/0261310 A1 | 8/2022 | Ishikawa et al. |
| 2022/0334917 A1 | 10/2022 | Veches |
| 2022/0337271 A1 | 10/2022 | Hanna |
| 2022/0365692 A1 | 11/2022 | Vankamamidi et al. |
| 2022/0398042 A1 | 12/2022 | Song et al. |
| 2022/0415398 A1 | 12/2022 | Lien et al. |
| 2023/0146549 A1 | 5/2023 | Lien et al. |
| 2023/0161665 A1 | 5/2023 | Choi et al. |
| 2023/0185665 A1 | 6/2023 | Ayyapureddi |
| 2023/0223096 A1 | 7/2023 | Bains et al. |
| 2023/0289072 A1 | 9/2023 | Cho et al. |
| 2023/0298682 A1 | 9/2023 | Suh et al. |
| 2023/0350581 A1 | 11/2023 | Ayyapureddi |
| 2023/0350748 A1 | 11/2023 | Ayyapureddi |
| 2023/0352064 A1 | 11/2023 | Ayyapureddi |
| 2023/0352112 A1 | 11/2023 | Ayyapureddi |
| 2024/0079074 A1 | 3/2024 | Bak et al. |
| 2024/0086520 A1 | 3/2024 | Kaplan et al. |
| 2024/0096404 A1 | 3/2024 | Cho et al. |
| 2024/0126438 A1 | 4/2024 | Suh et al. |
| 2024/0160351 A1 | 5/2024 | Ayyapureddi et al. |
| 2024/0160524 A1 | 5/2024 | Ayyapureddi et al. |
| 2024/0160527 A1 | 5/2024 | Ayyapureddi et al. |
| 2024/0161855 A1 | 5/2024 | Smith et al. |
| 2024/0161856 A1 | 5/2024 | Smith et al. |
| 2024/0161859 A1 | 5/2024 | Ayyapureddi et al. |
| 2024/0170088 A1 | 5/2024 | Smith et al. |
| 2024/0176699 A1 | 5/2024 | Ayyapureddi et al. |
| 2024/0177794 A1 | 5/2024 | Vogelsang |
| 2024/0220149 A1 | 7/2024 | Kim et al. |
| 2024/0248796 A1 | 7/2024 | Ayyapureddi |
| 2024/0256382 A1 | 8/2024 | Ayyapureddi |
| 2024/0272979 A1 | 8/2024 | Ayyapureddi |
| 2024/0272984 A1 | 8/2024 | Ayyapureddi |
| 2024/0273014 A1 | 8/2024 | Ayyapureddi |
| 2024/0274223 A1 | 8/2024 | Ayyapureddi |
| 2024/0281327 A1 | 8/2024 | Ayyapureddi et al. |
| 2024/0289266 A1 | 8/2024 | Ayyapureddi |
| 2024/0321328 A1 | 9/2024 | Ayyapureddi |
| 2024/0377952 A1 | 11/2024 | Song et al. |
| 2024/0394178 A1 | 11/2024 | Partsch |
| 2024/0419538 A1 | 12/2024 | Huang et al. |
| 2025/0077103 A1 | 3/2025 | Ayyapureddi |
| 2025/0077424 A1 | 3/2025 | Ayyapureddi |
| 2025/0078906 A1 | 3/2025 | Kim et al. |
| 2025/0078949 A1 | 3/2025 | Ayyapureddi |
| 2025/0078950 A1 | 3/2025 | Ayyapureddi |
| 2025/0110643 A1 | 4/2025 | Ayyapureddi |
| 2025/0110825 A1 | 4/2025 | Ayyapureddi |
| 2025/0110830 A1 | 4/2025 | Ayyapureddi |
| 2025/0111887 A1 | 4/2025 | Ayyapureddi |
| 2025/0112643 A1 | 4/2025 | Ayyapureddi |
| 2025/0123924 A1 | 4/2025 | Ayyapureddi et al. |
| 2025/0138940 A1 | 5/2025 | Cho et al. |
| 2025/0156087 A1 | 5/2025 | Ayyapureddi |

FOREIGN PATENT DOCUMENTS

| | | | |
|---|---|---|---|
| WO | 2024107503 | A1 | 5/2024 |
| WO | 2024107504 | A1 | 5/2024 |

(56) References Cited

FOREIGN PATENT DOCUMENTS

| | | |
|---|---|---|
| WO | 2024167711 A1 | 8/2024 |
| WO | 2025053912 A1 | 3/2025 |
| WO | 2025075696 A1 | 4/2025 |
| WO | 2025075697 A1 | 4/2025 |

OTHER PUBLICATIONS

U.S. Appl. No. 18/734,189, titled "Apparatuses, Systems, and Methods for Managing Metadata Storage At a Memory" filed Jun. 5, 2024, pp. all pages of application as filed.

U.S. Appl. No. 18/743,994 titled "Apparatuses and Methods for Shared Codeword in 2-PASS Access Operations" filed Jun. 14, 2024, pp. all pages of the application as filed.

U.S. Appl. No. 18/745,577 titled "Apparatuses and Methods for Half-Page Modes of Memory Devices" filed Jun. 17, 2024, pp. all pages of the application as filed.

U.S. Appl. No. 18/745,843 titled "Apparatuses and Methods for Half-Page Modes of Memory Devices" filed Jun. 17, 2024, pp. all pages of the application as filed.

U.S. Appl. No. 18/745,877 titled "Apparatuses and Methods for Half-Page Modes of Memory Devices" filed Jun. 17, 2024, pp. all pages of the application as filed.

U.S. Appl. No. 18/745,894 titled "Apparatuses and Methods for Half-Page Modes of Memory Devices" filed Jun. 17, 2024, pp. all pages of the application as filed.

U.S. Appl. No. 18/747,658, titled "Apparatuses and Methods for Bounded Fault Compliant Metadata Storage" filed, pp. all pages of application as filed.

U.S. Appl. No. 18/747,676, titled "Apparatuses and Methods for Alternate Memory Die Metadata Storage", filed Jun. 19, 2024, pp. all pages of application as filed.

U.S. Appl. No. 18/747,696, titled "Apparatuses and Methods for Scalable 1-PASS Error Correction Code Operations", filed Jun. 19, 2024, pp. all pages of application as filed.

U.S. Appl. No. 18/747,712, titled "Apparatuses and Methods for Granular Single-Pass Metadata Access Operations" filed Jun. 19, 2024, pp. all pages of application as filed.

U.S. Appl. No. 18/747,635, titled "Apparatuses and Methods for Read/Modify/Writemetadata Access Operations" filed Jun. 19, 2024, pp. all pages of application as filed.

U.S. Appl. No. 19/025,934, titled "Apparatuses, Systems, and Methods for Managing Metadata Security and Access" filed Jan. 16, 2025, pp. all pages of application as filed.

U.S. Appl. No. 17/730,381, titled "Apparatuses, Systems, and Methods for Per Row Error Scrub Information", filed Apr. 27, 2022; pp. all pages of application as filed.

U.S. Appl. No. 17/730,396, titled "Apparatuses, Systems, and Methods for Per Row Error Scrub Information Registers", filed Apr. 27, 2022; pp. all pages of application as filed.

U.S. Appl. No. 17/731,024, titled "Apparatuses, Systems, and Methods for Managing Metadata Storage At a Memory", filed Apr. 27, 2022; pp. all pages of the application as filed.

U.S. Appl. No. 18/424,342 titled "Apparatuses and Methods for Bounded Fault Compliant Metadata Storage" filed Jan. 26, 2024; pp. all pages of application as filed.

U.S. Appl. No. 18/430,381, titled "Apparatuses, Systems, and Methods for Storing Memory Metadata", filed Feb. 1, 2024; pp. all pages of application as filed.

U.S. Appl. No. 18/430,406, titled "Apparatuses, Systems, and Methods for Storing Memory Metadata", filed Feb. 1, 2024; pp. all pages of application as filed.

U.S. Appl. No. 18/431,232, titled "Apparatuses, Systems, and Methods for Storing Memory Metadata", filed Feb. 2, 2024; pp. all pages of application as filed.

U.S. Appl. No. 18/431,306, titled "Apparatuses, Systems, and Methods for Storing Memory Metadata", filed Feb. 2, 2024; pp. all pages of application as filed.

U.S. Appl. No. 18/441,775 titled "Apparatuses and Methods for Settings for Adjustable Write Timing" filed Feb. 14, 2024, pp. all pages of the application as filed.

U.S. Appl. No. 18/441,830 titled "Apparatuses, Systems, and Methods for Storing and Accessing Memory Metadata and Error Correction Code Data" filed Feb. 14, 2024, pp. all pages of the application as filed.

U.S. Appl. No. 18/504,215 titled "Apparatuses and Methods for Enhanced Metadata Support" filed Nov. 8, 2023; pp. all pages of application as filed.

U.S. Appl. No. 18/504,234 titled "Apparatuses and Methods for Enhanced Metadata Support" filed Nov. 8, 2023; pp. all pages of application as filed.

U.S. Appl. No. 18/504,302 titled "Apparatuses and Methods for Configurable ECC Modes" filed Nov. 8, 2023; pp. all pages of application as filed.

U.S. Appl. No. 18/504,316 titled "Apparatuses and Methods for Configurable ECC Modes" filed Nov. 8, 2023; all pages of application as filed.

U.S. Appl. No. 18/504,324 titled "Apparatuses and Methods for Single-Pass Access of ECC Information, Metadata Information or Combinations Thereof" filed Nov. 8, 2023, all pages of application as filed.

U.S. Appl. No. 18/504,342 titled "Apparatuses and Methods for Single-Pass Access of ECC Information, Metadata Information or Combinations Thereof" filed Nov. 8, 2023; pp. all pages of application as filed.

U.S. Appl. No. 18/504,353 titled "Apparatuses and Methods for Separate Write Enable for Single-Pass Accessof Data, Metadata, and Parity Information" filed Nov. 8, 2023; pp. all pages of application as filed.

U.S. Appl. No. 18/504,362 titled "Apparatuses and Methods for Separate Write Enable for Single-Pass Access of Data, Metadata, and Parity Information" filed Nov. 8, 2023; pp. all pages of application as filed.

U.S. Appl. No. 17/730,992 titled "Apparatuses, Systems, and Methods for Managing Metadata Security and Access" filed Apr. 27, 2022, pp. all pages of application as filed.

PCT Application No. PCT/US24/39192 titled "Apparatuses and Methods for Scalable 1-PASS Error Correction Code Operations" filed Jul. 23, 2024, pp. all pages of the application as filed.

PCT Application No. PCT/US24/39195 titled "Apparatuses and Methods for Half-Page Modes of Memory Devices" filed Jul. 23, 2024, pp. all pages of the application as filed.

PCT Application No. PCT/US24/39231 titled "Apparatuses and Methods for Granular Single-Pass Metadata Access Operations" filed Jul. 24, 2024, pp. all pages of the application as filed.

Chen et al., "CATCAM: Constant-time Alteration Ternary CAM with Scalable In-Memory Architecture"; 2020 53rd Annual IEEE/ACM International Symposium on Microarchitecture (MICRO), Athens, Green; Oct. 17-21, 2020; pp. 342-355.

J. F. Philippe Marchand "An Alterable Programmable Logic Array"; IEEE Journal of Solid-State Circuits, vol. sc-20, No. 5, Oct. 1985; pp. 1061-1066.

Lumenci Team "High Bandwidth Memory (HBM3)" https://lumenci.com/blogs/high-bandwidth-memory; Editorial Team at Lumenci, Jul. 14, 2022; pp. 1-3.

U.S. Appl. No. 19/360,159 titled "Apparatuses and Methods for Enhanced Metadata Support" filed Oct. 16, 2025; pp. all pages of the application as filed.

U.S. Appl. No. 19/366,908 titled "Apparatuses and Methods for Configurable ECC Modes", filed Oct. 23, 2025; pp. all pages of application as filed.

U.S. Appl. No. 19/376,027 titled "Apparatuses and Methods for Single-Pass Access of ECC Information, Metadata Information or Combinations Thereof", filed Oct. 31, 2025; pp. all pages of application as filed.

* cited by examiner

APPARATUSES AND METHODS FOR BOUNDED FAULT COMPLIANT METADATA STORAGE

CROSS-REFERENCE TO RELATED APPLICATIONS

This application claims the filing benefit of U.S. Provisional Application No. 63/482,480, filed Jan. 31, 2023. This application is incorporated by reference herein in its entirety and for all purposes.

BACKGROUND

This disclosure relates generally to semiconductor devices, and more specifically to semiconductor memory devices. In particular, the disclosure relates to volatile memory, such as dynamic random access memory (DRAM). Information may be stored on individual memory cells of the memory as a physical signal (e.g., a charge on a capacitive element). During an access operation, an access command may be received along with address information which specifies which memory cells should be accessed.

There is a growing interest in enabling the memory to store information in the array which is associated with pieces of data. For example, error correction information and/or metadata may be stored in the array along with their associated data. Memory modules may be capable of correcting certain sets of information. There may be a need to ensure that when metadata is used, the metadata does not extend across multiple sets, preventing correction.

DETAILED DESCRIPTION

Figure 1:
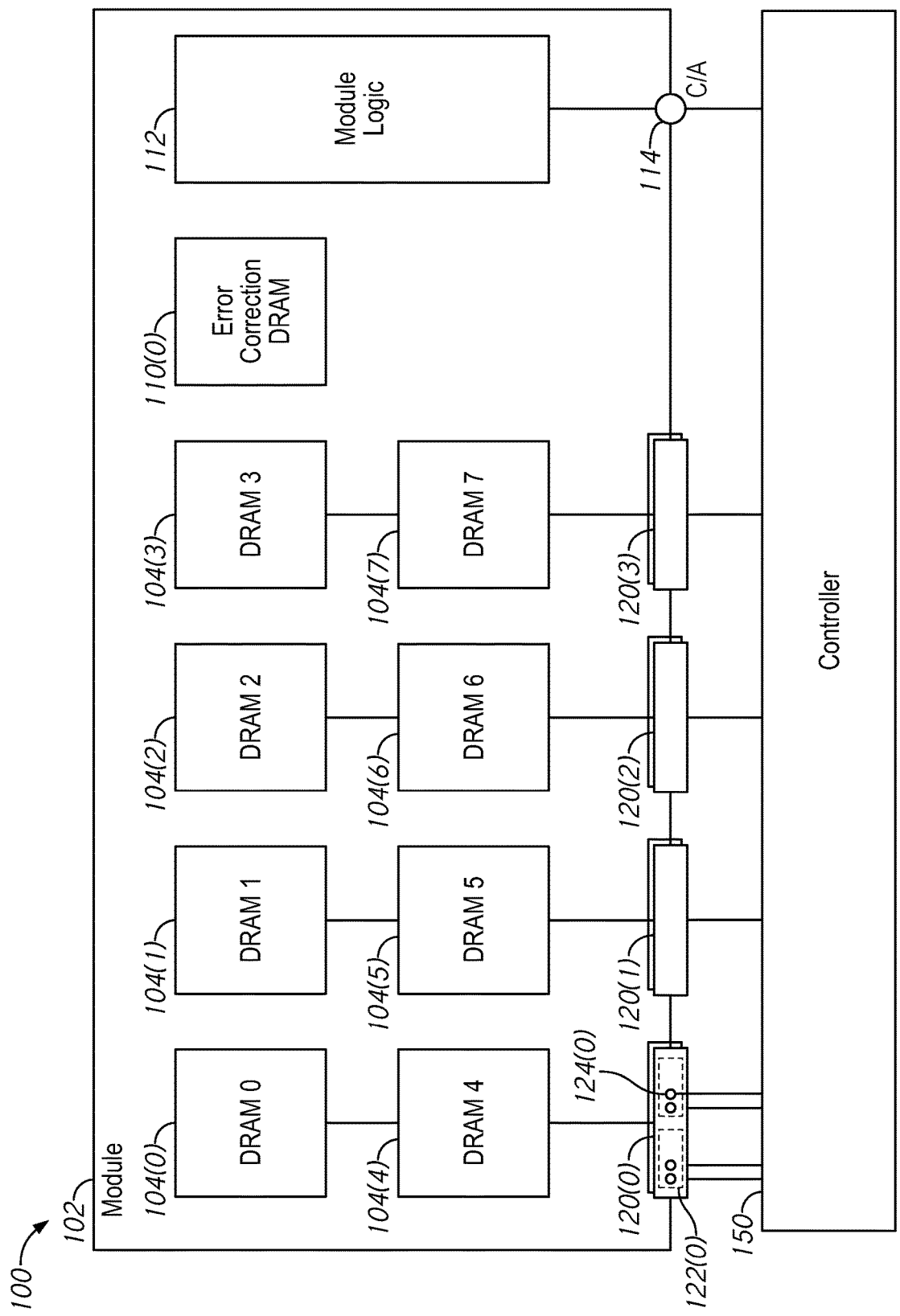
FIG. 1 is a block diagram of a memory system according to some embodiments of the present disclosure.

The following description of certain embodiments is merely exemplary in nature and is in no way intended to limit the scope of the disclosure or its applications or uses. In the following detailed description of embodiments of the present systems and methods, reference is made to the accompanying drawings which form a part hereof, and which are shown by way of illustration specific embodiments in which the described systems and methods may be practiced. These embodiments are described in sufficient detail to enable those skilled in the art to practice presently disclosed systems and methods, and it is to be understood that other embodiments may be utilized and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The following detailed description is therefore not to be taken in a limiting sense, and the scope of the disclosure is defined only by the appended claims.

Memory arrays may generally include a number of memory cells arranged at the intersection of word lines (rows) and bit lines/digit lines (columns). The columns may be grouped together into column planes, and a column select (CS) signal may be used to select a set of columns within each of the active column planes to provide data. When an access command is received, the memory may prefetch a codeword (e.g., a number of bits of data) along with one or more associated bits from the memory and either replace the prefetched data with new data (e.g., as part of a write operation) or provide the prefetched data off the memory device (e.g., as part of a read operation). Some memory modes may involve providing less than all of the prefetched data off the memory device. For example, in a conventional memory device, in certain modes half of the prefetched data may be provided off the device, and the remainder may ignored.

Memory devices may store additional information which is associated with each codeword. For example, the additional information may include parity bits which are used as part of an error correction scheme, metadata which includes information about the data codeword (or is a portion of information about a larger set of data which includes the codeword), or combinations thereof.

As used herein, the term data may represent any bits of information that the controller wishes to store and/or retrieve from the memory. The term metadata may represent any bits of information about the data which the controller writes to and/or receives from the memory. For example, the metadata may be information that the controller generates about the data, about how or where the data memory is stored in the memory, about how many errors have been detected in the data, etc. The data and the metadata together represent information written to the memory by a controller and then also read from the memory by the controller, with the data and metadata differing in content and how they are generated in that the metadata is based on information about the data. The term parity may represent any bits generated by an error correction circuit of the memory based on the data, metadata, or combinations thereof. The parity may generally stay within the memory. In some embodiments, the amount of data and/or metadata retrieved as part of a single access operation may represent a set of bits which are a fragment of a larger piece of information. For example, the metadata bits retrieved as part of a single access operation (e.g., 4 bits) may not have any meaning on their own, but may have meaning when combined with sets of metadata bits retrieved as part of other access operations (e.g., to other memory arrays and/or to the same array at different times).

Memory devices may be packaged together onto a memory module. The memory module may include a number of memory devices, each of which stores data, and one or more error correction memory devices, which may store information used to correct errors when data is read out from the memory. For example, each memory device may have a number of input/output (or DQ) terminals. Each DQ terminal may send or receive a burst of serial data from/to the associated memory. Some memory module architectures may use the error correction memory devices to be able to correct up to one DQ terminal (or one set of DQ terminals) worth of data.

Various faults may cause errors in the data stored in the memory. However, many faults may be localized to certain areas of the memory array. For example, if a sub-word line driver fails, then memory cells along that word line in the region of the memory array operated by that driver may fail. The data may be organized such that data associated with different DQ terminals is stored in different areas of the memory array. Accordingly, a fault may only corrupt data along one DQ terminal, which may make the error 'bounded fault' compliant, as the fault does not exceeds the boundary (e.g., 1 DQ or set of DQs) of what the module can correct. However, in a conventional memory device, the metadata associated with multiple DQ terminals may end up stored in a single area. Accordingly, if the fault happens to fail in that area, then information across multiple DQ terminals may be corrupted, which cannot be corrected. There may therefore be a need to reorganize the memory storage such that the metadata is bounded fault compliant and an error does not propagate across multiple data terminals (or multiple sets of data terminals)

The present disclosure is drawn to apparatuses, systems, and methods for bounded fault compliant metadata storage. A memory may have data and metadata associated with multiple DQ terminals. For example, a first portion of the data and a first portion of the metadata may be received at a first DQ terminal and a second portion of the data and a second portion of the metadata may be received at a second DQ terminal as part of a write operation to the memory. The first portion of the plurality of metadata bits may be stored at a first location of the memory array (e.g., in memory cells of a first column plane) while the second portion of the plurality of metadata bits may be stored at a second location of the memory array (e.g., in memory cells of a second column plane) which is remote from the first location. For example, the two locations may be along a word line, but in portions of that word line which are operated by different sub-word line drivers. In this manner, if a sub-word line driver fails, the error will be limited to a single DQ terminal, which allows the metadata to be bounded fault compliant.

In an example implementation, the memory module may use a 9×2p2 architecture. In other words, the memory may include 9 total memory devices (8 data devices and 1 error correction device) and each of the data devices may operation in a 2p2 architecture, where each memory includes two pseudo-channels, each of which uses two data (DQ) terminals. During an access operation, 64 bits of data may be sent or received, in a burst of 32 data bits along each of the two data terminals. The module may store either 4 or 8 bytes of metadata depending on the embodiment, and since there are 8 data devices, each device may store either 4 or 8 bits of metadata associated with the 64 bits of data. Accordingly, each data terminal sends/receives a burst length of 34 serial bits (32 data bits and 2 metadata bits) or 36 serial bits (32 data bits and 4 metadata bits). The module may be capable of correcting up to a single DQ terminals worth of error. The metadata may be stored in two locations depending on which DQ terminal it is associated with. The metadata associated with a first DQ terminal is associated with a first location, and the metadata associated with a second DQ terminal is associated with a second location.

FIG. 1 is a block diagram of a memory system according to some embodiments of the present disclosure. The memory system 100 includes a memory module 102 and a controller 150 which operates the memory module 102. The module includes a number of memory devices 104 and 110. The memory devices 104 may be used to store data and may generally be referred to as data memory devices 104, while the memory device 110 is used to correct errors in data read from the data memory devices 104. The memory device 110 may be referred to as an error correction memory device 110. A module logic 112 receives commands and addresses over a command/address C/A bus from the controller 150 through a C/A terminal 114 and distributes those commands and addresses to the memory devices 104 and 110 over internal command and address buses (not shown). Data is communicated between the controller 150 and the module 102 along data buses which couple to data terminals (DQ) terminals 124 of the module 102. The data terminals 124 are organized into pseudo-channels 122 and channels 120. Each channel is a set of data terminals 124 associated with a memory device 104.

The present embodiment may be described with respect to a 9×2p2 memory module 102. In the 9×2p2 architecture, there are nine total memory devices 104 and 110. Eight data memory devices 104(0) to 104(7) and one error correction memory device 110. Each channel 120(0) to 120(7) includes one or more pseudo-channels 122, which may be operated independently of each other. In this embodiment, each channel 120 includes two pseudo-channels 122, each of which includes two data terminals 124. Since the memory devices and channels may generally be similar to each other, only a single device 104(0) and its associate channel 120(0) are described in detail herein. In order to simplify the layout of the figure, an arrangement of two rows of four devices 104 each is shown, and their associated channels 120 are shown as stacked boxes. However the representation of FIG. 1 does not necessarily represent the layout of a physical device. For example, a single row of 8 devices 104 may be used. Similarly, various buses and signal lines have been simplified down to a single line for clarity on the drawing, however, multiple physical signal lines may be represented by a single line in the drawing.

During an example write operation, the controller 150 provides a write command and addresses (e.g., row, column, and/or bank addresses as explained in more detail herein) over the C/A terminal 114 to the module 102. The module logic 112 distributes the command and address to the data memory devices 104(0) to 104(7). The controller 150 also provides data to be written along the various DQ channels 120(0) to 120(7). Since the pseudo-channels 122 may be operated independently, we will consider a single pseudo-channel 122 and its two DQ terminals 124. Each data terminal receives a serial burst of bits, which together represent a codeword of data. For example, each terminal receives 32 data bits in series, for a total of 64 data bits. The controller 150 may also provide metadata bits. In the described embodiments, either 4 bytes of metadata or 8 bytes of metadata are stored on the module 102 per access operation. These metadata bytes are distributed across the data devices 104 of the module. Since there are 8 total data devices 104, in the embodiment where there are 4 bytes of metadata, each device stores 4 bits of metadata per access operation. In the embodiment where there are 8 bytes of metadata, each device 104 stores 8 bits of metadata. With two DQ terminals 124 per pseudo-channel 122, a total of 2 or 4 bits may be received per DQ terminal for the 4 byte and 8 byte embodiments respectively. Accordingly, during the write operation, a total of 34 bits or 36 bits per DQ terminal are sent by the controller 150 and received by the DQ terminal 124, 32 bits of data and either 2 or 4 bits of metadata. In some embodiments, the burst may be organized so that the data and metadata are sequential (e.g., 32 consecutive data bits and then 2 or 4 consecutive metadata bits). Other arrangements of the burst may be used in other example embodiments (e.g., metadata first, metadata interspersed among the data bits, etc.). The data is written to a location specified by the address in the data memory devices 104.

During an example read operation, the controller 150 provides a read command and addresses along the C/A terminal 114. The module logic 112 distributes these to the memory devices 104 to 110 and data and metadata is read out from the locations specified by the addresses. Each DQ terminal 124 provides 32 bits of read data and 2 or 4 bits of read metadata, for a total of 64 data bits per device 104 and 4 or 8 bits of metadata per device 104.

The read and write operations may use a single-access pass to store both the data (as well as parity generated based on the data and metadata) along with the metadata bits. Each memory device may be capable of accessing up to 136 bits in a single access pass (e.g., generally 128 data bits and 8 parity bits). In the 9×2p2 architecture, 64 data bits plus 4 or 8 metadata bits are used (along with some number of parity bits, for example 8 parity bits). Accordingly, the data (plus parity) and metadata may all be accessed as a single access pass. For example, as explained in more detail herein, the memory array may be split into two portions, each of which is associated with a value of a column plane select bit in the column address. Data may be stored in a selected one of the portions, while the metadata may be stored in the non-selected portion. The metadata may be stored in two locations of the non-selected portion which are remote from each other, such that a failure which effects one location is unlikely to also affect the other location.

During an example read operation, the error correction memory device 110 may be used to identify and correct errors in the data. The error correction memory device 110 may support correction of the data and metadata along one DQ terminal (e.g., the 34 or 36 bits provided along one of the terminals 124 in a pseudo-channel). The controller 150 may use information stored on the error correction memory device 110 to enable correction of the information after the information is received by the controller 150 during a read operation. For example, the error correction memory device 110 may store repair information (e.g., parity bits) which are associated with the data and metadata read out across all the data devices 104(0) to 104(3), and that parity may be used by a repair circuit (not shown) of the controller 150 to enable correction in the data and metadata of up to one of the DQ terminals. For example, if the data and metadata being provided along a first DQ terminal in a first pseudo-channel associated with memory 104(0) is corrupted, then the error correction device 110 enables the repair of that data and metadata. However, if the errors exist in bits across both DQ terminals in the pseudo-channel then correction may not be possible.

To reduce the likelihood that errors in the metadata propagate across multiple DQ terminals, the metadata associated with each DQ terminal may be stored in a different location in the memory array within that device. The different locations may be remote from each other such that a defect which effects one location is unlikely to affect both. The memory device 104 may use internal logic to determine where to store the metadata, as described in more detail herein.

In some embodiments, each memory device 104 may also have its own separate error correction, for example an error correction code (ECC) circuit which can repair one or more bits of error in the codeword. For example, each memory 104 may implement single error correction (SEC) and correct up to 1 bit of error in the 64 bits read out as part of a read command. The ECC circuits in each of the memory devices 104 may generate parity bits when the data/metadata is written, and then may use those parity bits to detect and/or correct errors. The parity bits may generally stay within the devices 104, and not be read out to the controller 150.

Figure 2:
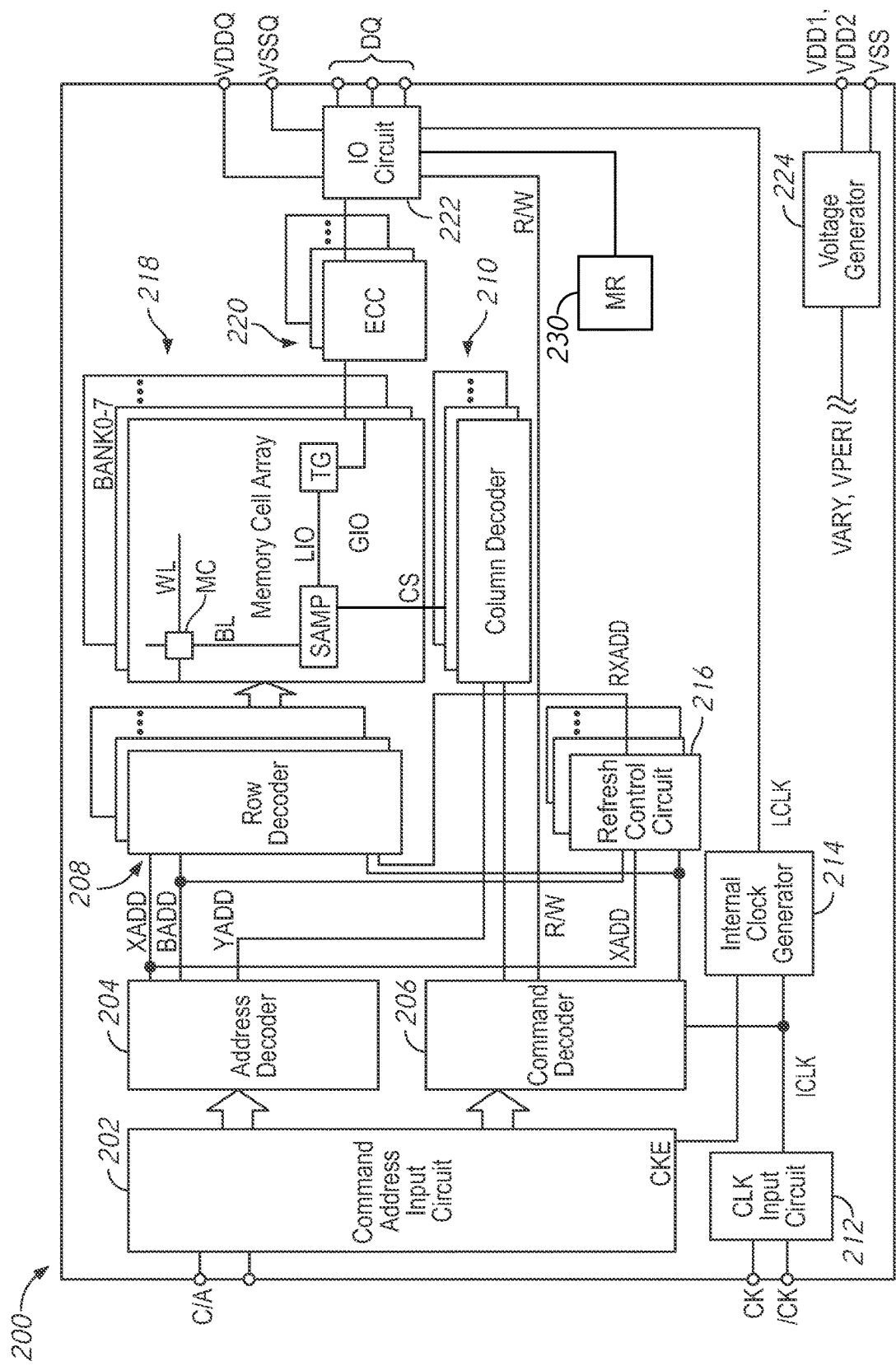
FIG. 2 is a block diagram of a semiconductor device according an embodiment of the disclosure.

FIG. 2 is a block diagram of a semiconductor device according an embodiment of the disclosure. The semiconductor device 200 may be a semiconductor memory device, such as a DRAM device integrated on a single semiconductor chip. For example, the device 100 may implement one of the devices 204 of the module 202 of FIG. 2.

The semiconductor device 200 includes a memory array 218. The memory array 218 is shown as including a plurality of memory banks. In the embodiment of FIG. 2, the memory array 218 is shown as including eight memory banks BANK0-BANK7. More or fewer banks may be included in the memory array 218 of other embodiments.

Each memory bank includes a plurality of word lines WL, a plurality of bit lines BL, and a plurality of memory cells MC arranged at intersections of the plurality of word lines WL and the plurality of bit lines BL. The selection of the word line WL is performed by a row decoder 108 and the selection of the bit lines BL is performed by a column decoder 210. In the embodiment of FIG. 2, the row decoder 208 includes a respective row decoder for each memory bank and the column decoder 210 includes a respective column decoder for each memory bank.

The bit lines BL are coupled to a respective sense amplifier (SAMP). Read data from the bit line BL is amplified by the sense amplifier SAMP, and transferred to an ECC circuit 220 over local data lines (LIO), transfer gate (TG), and global data lines (GIO). Conversely, write data outputted from the ECC circuit 220 is transferred to the sense amplifier SAMP over the complementary main data lines GIO, the transfer gate TG, and the complementary local data lines LIO, and written in the memory cell MC coupled to the bit line BL.

The semiconductor device 200 may employ a plurality of external terminals, such as solder pads, that include command and address (C/A) terminals coupled to a command and address bus to receive commands and addresses, clock terminals to receive clocks CK and /CK, data terminals DQ coupled to a data bus to provide data, and power supply terminals to receive power supply potentials VDD, VSS, VDDQ, and VSSQ. The external terminals may couple directly to the controller (e.g., 150 of FIG. 1) and/or may couple to various buses/connectors of the module (e.g., 102 of FIG. 1).

The clock terminals are supplied with external clocks CK and /CK that are provided to an input circuit 212. The external clocks may be complementary. The input circuit 212 generates an internal clock ICLK based on the CK and /CK clocks. The ICLK clock is provided to the command decoder 206 and to an internal clock generator 214. The internal clock generator 214 provides various internal clocks LCLK based on the ICLK clock. The LCLK clocks may be used for timing operation of various internal circuits. The internal data clocks LCLK are provided to the input/output circuit 222 to time operation of circuits included in the input/output circuit 222, for example, to data receivers to time the receipt of write data. The input/output circuit 222 may include a number of interface connections, each of which may be couplable to one of the DQ pads (e.g., the solder pads which may act as external connections to the device 200).

The C/A terminals may be supplied with memory addresses. The memory addresses supplied to the C/A terminals are transferred, via a command/address input circuit 202, to an address decoder 204. The address decoder 204 receives the address and supplies a decoded row address XADD to the row decoder 208 and supplies a decoded column address YADD to the column decoder 210. The decoded row address XADD may be used to determine which row should be opened, which may cause the data along the bit lines to be read out along the bit lines. The column decoder 210 may provide a column select signal CS, which may be used to determine which sense amplifiers provide data to the LIO. The address decoder 204 may also supply a decoded bank address BADD, which may indicate the bank of the memory array 218 containing the decoded row address XADD and column address YADD.

The C/A terminals may be supplied with commands. Examples of commands include timing commands for controlling the timing of various operations, access commands for accessing the memory, such as read commands for performing read operations and write commands for performing write operations, as well as other commands and operations. The access commands may be associated with one or more row address XADD, column address YADD, and bank address BADD to indicate the memory cell(s) to be accessed.

The commands may be provided as internal command signals to a command decoder 106 via the command/address input circuit 202. The command decoder 206 includes circuits to decode the internal command signals to generate various internal signals and commands for performing operations. For example, the command decoder 206 may provide signals which indicate if data is to be read, written, etc.

The device 200 may receive an access command which is a write command. When the write command is received, and a bank address, a row address and a column address are timely supplied with the write command, write data and metadata supplied to the data terminals DQ by the controller is provided along the data bus and written to memory cells in the memory array 218 corresponding to the row address and column address. The write command is received by the command decoder 206, which provides internal commands so that the write data along with metadata is received by data receivers in the input/output circuit 222. The write data is supplied via the input/output circuit 222 to the ECC circuit 220. The ECC circuit generates parity bits based on the received data and the data, metadata, and parity are provided to the memory array 218 to be written along a word line specified by the row address to memory cells specified by the column address. The metadata may be written to at least two locations along the word line which are remote to each other.

The device 200 may receive an access command which is a read command. When a read command is received, and a bank address, a row address and a column address are timely supplied with the read command, read data is read from memory cells in the memory array 218 corresponding to the row address and column address. The read command is received by the command decoder 206, which provides internal commands so that read data from the memory array 218 is provided to the ECC circuit 220. The ECC circuit 220 receives data bits, and parity bits from the array and detects and/or corrects errors in the data and metadata bits. The correct read data is provided along the data bus along with metadata also retrieved from the array 218, and the data and metadata are output to outside from the data terminals DQ via the input/output circuit 222.

The device 200 includes refresh control circuits 216 each associated with a bank of the memory array 218. Each refresh control circuit 216 may determine when to perform a refresh operation on the associated bank. The refresh control circuit 216 provides a refresh address RXADD (along with one or more refresh signals, not shown in FIG. 1). The row decoder 208 performs a refresh operation on one or more word lines associated with RXADD. The refresh control circuit 216 may perform multiple types of refresh operation, which may determine how the address RXADD is generated, as well as other details such as how many word lines are associated with the address RXADD.

The ECC circuit 220 may detect and/or correct errors in the accessed data. As part of a write operation, the ECC circuit 220 may receive bits from the IO circuit 222 and generate parity bits based on those received bits. The received bits and parity bits are written to the memory array 218. During an example read operation, the ECC circuit 220 receives a set of bits and their associated parity bits from the array 218 and uses them to locate and/or correct errors. For example, in a single error correction (SEC) scheme, up to one bit of error may be located and detected. In a single error correction double error detection (SECDED) scheme, up to one bit of error may be corrected, but two errors may be detected (although the bits causing those errors are not individually located, so no correction can be made). The ECC circuit 220 may correct the information and then provide the corrected information (and/or a signal indicated detected errors) to the IO circuit 222. The parity bits may generally not be provided to the IO circuit 222.

The mode register 230 may include various settings, and may be used to enable a metadata mode of the memory 200. When metadata is enabled, the device 200 may store metadata which is associated with the data. For example, as part of a write operation the controller may provide data along with its associated metadata, and as part of a read operation may receive data and its associated metadata.

The memory 200 may be operated in various modes based on a number of the DQ pads which are used. In some embodiments, the mode register 230 may include settings which determine how many DQ pads are used, even if there are more DQ pads available. The mode may determine both how many DQ pads the controller expects to send/receive data along, as well as the format and/or number of bits which the controller expects as part of a single access command. For example, the memory may have 16 physical DQ pads. In a 2p2 mode, four of those DQ pads are used, divided into two pseudo-channels of two DQ pads each. The mode may also determine a burst length at each DQ terminal as part of a DQ operation. The burst length represents a number of serial bits at each DQ terminal during an access operation. For example, in the 2p2 mode, each data terminal may receive a burst of 32 data bits plus some number of metadata bits (e.g., either 2 or 4 per DQ terminal).

The power supply terminals are supplied with power supply potentials VDD and VSS. The power supply potentials VDD and VSS are supplied to an internal voltage generator circuit 224. The internal voltage generator circuit 224 generates various internal potentials VARY, and the like based on the power supply potentials VDD and VSS supplied to the power supply terminals.

The power supply terminals are also supplied with power supply potentials VDDQ and VSSQ. The power supply potentials VDDQ and VSSQ are supplied to the input/output circuit 222. The power supply potentials VDDQ and VSSQ supplied to the power supply terminals may be the same potentials as the power supply potentials VDD and VSS supplied to the power supply terminals in an embodiment of the disclosure. The power supply potentials VDDQ and VSSQ supplied to the power supply terminals may be different potentials from the power supply potentials VDD and VSS supplied to the power supply terminals in another embodiment of the disclosure. The power supply potentials VDDQ and VSSQ supplied to the power supply terminals are used for the input/output circuit 122 so that power supply noise generated by the input/output circuit 122 does not propagate to the other circuit blocks.

Figure 3:
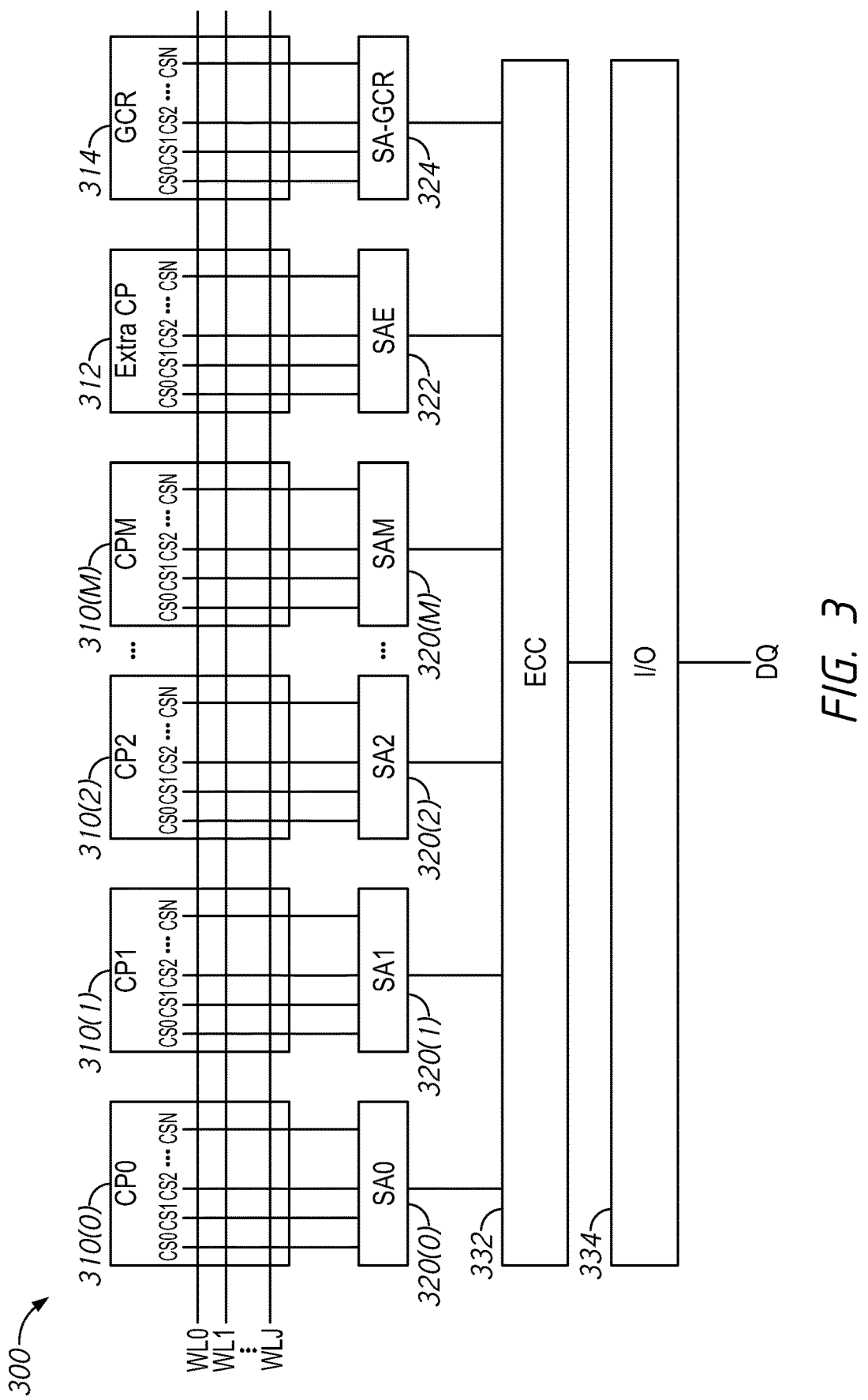
FIG. 3 is a block diagram of a memory device according to some embodiments of the present disclosure.

FIG. 3 is a block diagram of a memory device according to some embodiments of the present disclosure. The memory device 300 may, in some embodiments, represent a portion of the memory device 200 of FIG. 2. The view of FIG. 3 shows a portion of a memory array 310-314 and 320-324 which may be part of a memory bank (e.g., 218 of FIG. 2) along with selected circuits used in the data path such as the ECC circuit 332 (e.g., 220 of FIG. 2) and IO circuits 334 (e.g., 222 of FIG. 2). For clarity certain circuits and signals have been omitted from the view of FIG. 3.

The memory device 300 is organized into a number of column planes 310-314. Each of the column planes represents a portion of a memory bank. Each column plane 310-314 includes a number of memory cells at the intersection of word lines WL and bit lines. The bit lines may be grouped together into sets which are activated by a value of a column select (CS) signal. For the sake of clarity, only a single vertical line is used to represent the bit lines of each column select set, however, there may be multiple columns accessed by that value of CS. For example, each line may represent 8 bit lines, all accessed in common by a value of CS. As used herein, a 'value' of CS may refer to a decoded signal provided to sets of bit lines. So a first value may represent a first value of a multibit CS signal, or after decoding a signal line associated with that value being active. The word lines may be extend across multiple of the column planes 310-314.

The memory 300 includes a set of data column planes 310 as well as an extra column plane 312. The extra column plane 312 may be used to store additional information, such as error correction parity bits or metadata bits.

In some embodiments, the memory 300 may also include an optional global column redundancy (GCR) column plane 314. In some embodiments, the GCR plane 314 may have fewer memory cells (e.g., fewer column select groups) than the data column planes 310. The GCR CP 314 includes a number of redundant columns which may be used as part of a repair operation. If a value of the CS signal is identified as including defective memory cells in one of the data column planes 310, then the memory may be remapped such that the data which would have been stored in that column plane for that value of CS is instead stored in the GCR CP 314.

For example, in some embodiments the memory 310 may include 16 data column planes 310(0)-310(15). Each of those data column planes 310 includes 64 sets of column selects activated by a value of the column select signal, and each set of column select includes 8 bit lines. Accordingly, when a word line is opened responsive to a row address, and a column select signal is provided to each of the 16 column planes then 8 bits are accessed from each of the 16 column planes for a total of 128 bits. A column select signal is also provided to the extra column plane 312, although that column select signal may be a different value than the one provided to the data column planes 310 for an additional 8 bits. If a repair has been performed, the GCR CP 314 may also be accessed and the value on a GCR LIO may be used while ignoring the LIO of the column plane it is replacing. Accordingly, the maximum number of bits that can be retrieved as part of an access pass is 128 bits from the data column planes 310 (with 8 bits substituted from the GCR CP 314 if there has been a repair) along with 8 additional bits from the extra CP 312.

In the 2p2 architecture, fewer than 128 bits of data are accessed for a given access operation. Accordingly, only a portion of the data column planes 310 may be used to send/receive data. The column address may include a column plane select bit or bits which are used to determine which portion of the data column planes 310 are used. For example, the data column planes 310 may be split into two sets of eight data column planes each. A bit of the column address (e.g., CA10) may be used as the column plane select bit and may choose which set of data column planes is being used as part of the current access operation.

As described in more detail herein, during a given access operation, data may be stored in the portion of the column planes selected by the column plane select bit, while metadata (and in some cases parity) may be stored in one or more of the non-selected column planes. For example, the data may be stored in each column plane of the selected portion (e.g., 8 bits in each of 8 selected data column planes 310 for a total of 64 data bits). The metadata may be stored in two different locations of the array in the non-selected portion, such as in two different non-selected column planes, based on which DQ terminal the metadata was received along. For example, if the column plane select bit selects even data column planes, then the metadata may be stored in two different odd column planes. Depending on the amount of total metadata enabled, different numbers of metadata bits may be stored in the two locations. For example, if a total of 4 B of metadata (across the module) are used, then 2 bits may be stored in each location. If a total of 8 B of metadata (across the module) are used, then 4 bits may be stored in each location.

In some embodiments of the 9x2p2 architecture of the present disclosure, the parity bits may be store either in the extra column plane 312 or in one of the non-selected column planes. In an example implementation, each set of 64 data bits may be associated with 8 bits of parity generated by the ECC circuit 332. However, the extra column plane 312 may not have space for all of the parity bits. Accordingly, some parity bits may be stored in the extra column plane 312 and some may be stored in the non-selected data column planes 310 similar to the metadata (although the metadata and parity may be stored in different non-selected column planes for a given set of data bits).

In an example write operation, a controller (e.g., 150 of FIG. 1) provides data and metadata to the memory device which are written as part of a single access pass. In the example embodiment discussed herein, 64 bits of data are provided along with 4 or 8 bits of metadata, such that each of the two DQ terminals per pseudo-channel receives a burst length of 34 (32 data bits and 2 metadata bits) or 36 bits (32 data bits and 4 metadata bits). The data is provided to the ECC circuit 332 which generates a set of parity bits based on the data and metadata bits. For example 8 parity bits may be generated based on the 64 data bits and 4 or 8 metadata bits. Based on the column address half of the data column planes 310 may be selected and the column decoder may provide a first value of the CS signal to the selected half of the column planes and provide a second value of the CS signal to the non-selected half of the column planes.

The data may be written to the memory cells at the intersection of the active word line and the bit lines selected by the first value of CS in the selected half of the column planes 310. The metadata may be written to the memory cells at the intersection of the active word line and the bit lines selected by the second value of CS in a selected two of the non-selected half of the column planes. For example, if the even column planes are selected, then metadata may be written to column planes 1 and 5. Depending on the column address, the parity bits may either be written to the memory cells at the intersection of the word line and the bit lines selected by a CS signal (which may be the first CS value or a different value) in the extra column plane 312, or they may be written to the memory cells at the intersection of the word line and the bit lines selected by a third value of the CS signal in one of the non-selected column planes.

In some embodiments, since 8 bit lines are activated by each CS value, and there are either 2 or 4 metadata bits written to each location, it may be useful to protect the remaining 6 or 4 bits so they are not erroneously overwritten. In some embodiments, the memory may perform a read/modify/write cycle to read out all 8 bits, modify only the 2 or 4 which are being changed, and then write all 8 bits back. In some embodiments, separate write enable signals may be used such that only some of the sense amplifiers associated with the CS value are modified at one time (rather than all 8). For example, only the sense amplifiers associated with the 2 or 4 bitlines which will store the new metadata bits may be modified. This may prevent the data on the bit lines coupled to the non-related sense amplifiers from being modified without requiring additional operations (e.g., a read/modify/write cycle). Other options for protecting the non-accessed bits associated with the CS signal may be used in other example embodiments.

In an example read operation, the data, metadata, and parity are retrieved as part of a single access pass. For example, the second CS value is provided by the column decoder to the selected locations in the non-selected portion of the column planes 310 and the metadata is retrieved from the two locations it was saved in. Half the bits (e.g., 2 or 4 bits) are retrieved from one location and half the bits (e.g., 4 bits) are retrieved from the second location. As part of the same access, the column decoder provides the first CS signal to the selected portion of the column planes 310 and the data bits are read from the column planes 310. The parity is retrieved either from the extra column plane 312 based on the first CS signal, or from another one of the non-selected column planes based on the third CS signal value. The data (e.g., 64 bits), metadata (e.g. 4 or 8 bits) and parity (e.g., 8 bits) are provided to the ECC circuit 332 which performs error correction on the data and metadata based on the received bits. For example, the ECC circuit 332 may perform single error correction (SEC) where up to one bit of error in the data and metadata is located and corrected. Other types of error correction such as single error correction, double error detection (SECDED) may also be used. The corrected data bits and the corrected metadata (e.g., either 4 or 8 bits) are provided to the I/O circuit 334, where they provided to the DQ terminals.

Figure 4:
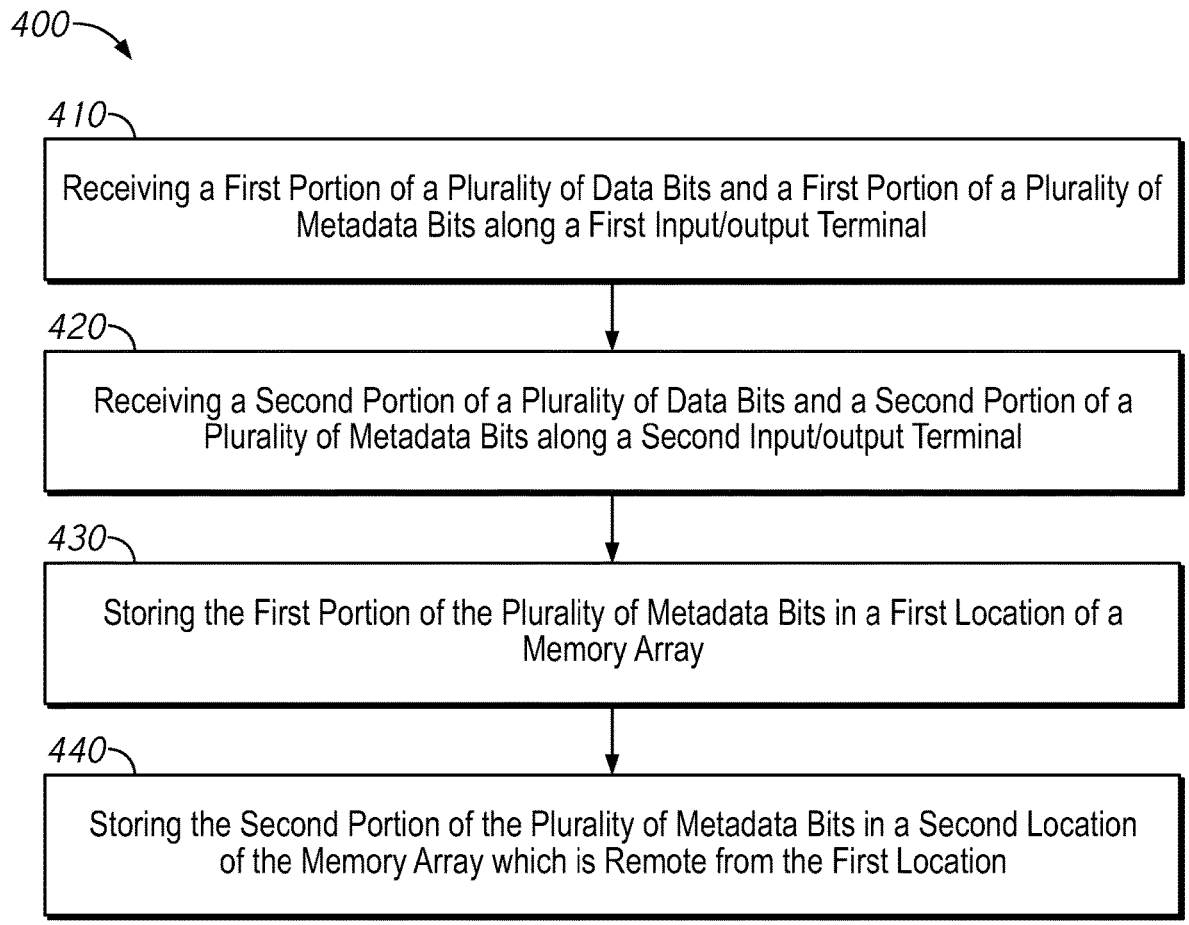
FIG. 4 is a flow chart of a method of writing data and metadata to a memory device according to some embodiments of the present disclosure.

FIG. 4 is a flow chart of a method of writing data and metadata to a memory device according to some embodiments of the present disclosure. The method 400 may, in some embodiments, be implemented by any of the apparatuses, systems, or parts thereof described herein. The method 400 represents a write operation performed by a memory device. For example, the method 400 may be implemented by one or more of the memory devices 104 of FIG. 1, 200 of FIG. 2, and/or 300 of FIG. 3.

The method 400 includes box 410, which describes receiving a first portion of a plurality of data bits and a first portion of a plurality of metadata bits along a first input/output terminal. The method 400 also includes box 420, which describes receiving a second portion of a plurality of data bits and a second portion of a plurality of metadata bits along a second input/output terminal. The steps of boxes 410 and 420 may generally happen more or less simultaneously to each other. For example, the plurality of data bits may be split into multiple portions, each of which are provided along an input/output terminal (e.g., a DQ terminal such as 124 of FIG. 1). The metadata may also be provided across multiple DQ terminals. For example, the method 400 may include receiving a burst of serial data bits and metadata bits along the first input/output terminal as the respective first portions and receiving a burst of serial data bits and metadata bits along the second input/output terminal as the respective second portions.

The method 400 may generally describe a method of a memory device performing a write operation, for example, responsive to an external write command sent by a controller (e.g., 150 of FIG. 1). For example, the method 400 may include providing a write command along with write data and metadata bits to the input/output terminals.

In some example embodiments, the device may be set up in a 9×2p2 with 4 B or 8 B of metadata configuration. There may be 64 bits of data divided into two portions of 32 bits each and 4 or 8 bits of metadata (per device) divided into two portions of 2 or 4 bits each. Accordingly, each of the two data terminals may receive a burst length of 34 total bits, 32 data bits and 2 metadata bits in the 4 B mode or a burst length of 36 total bits, 32 data bis and 4 metadata bits in the 8 B mode.

The method 400 may continue with box 430, which describes storing the first portion of the plurality of metadata bits in a first location (e.g., a first column plane) of a memory array. The method 400 also includes box 440, which describes storing the second portion of the plurality of metadata bits in a second location of the memory array (e.g., a second column plane) which is remote from the first location. For example, the first and the second locations may be separated enough that they do not share a sub-word line driver. The boxes 430 and 440 may be performed more or less simultaneously to each other.

In some embodiments, such as a 9×2p2 architecture, the method 400 may include selecting a first portion or a second portion of the data column planes, for example based on a state of a column plane select bit such as CA10. The method 400 may include writing the first and the second portion of the data to the selected portion of the data column planes, and writing the first portion of the metadata bits to a first location in the non-selected portion and writing the second portion of the metadata bits to a second location in the non-selected portion.

In some embodiments, the method may include generating a set of parity bits with an ECC circuit (e.g., 220 of FIGS. 2 and/or 332 of FIG. 3) based on the data and metadata bits. The method 400 may include writing the parity bits to either an extra column plane (e.g., 312 of FIG. 3) or to a third location in the non-selected portion of the data column planes.

Figure 5A:
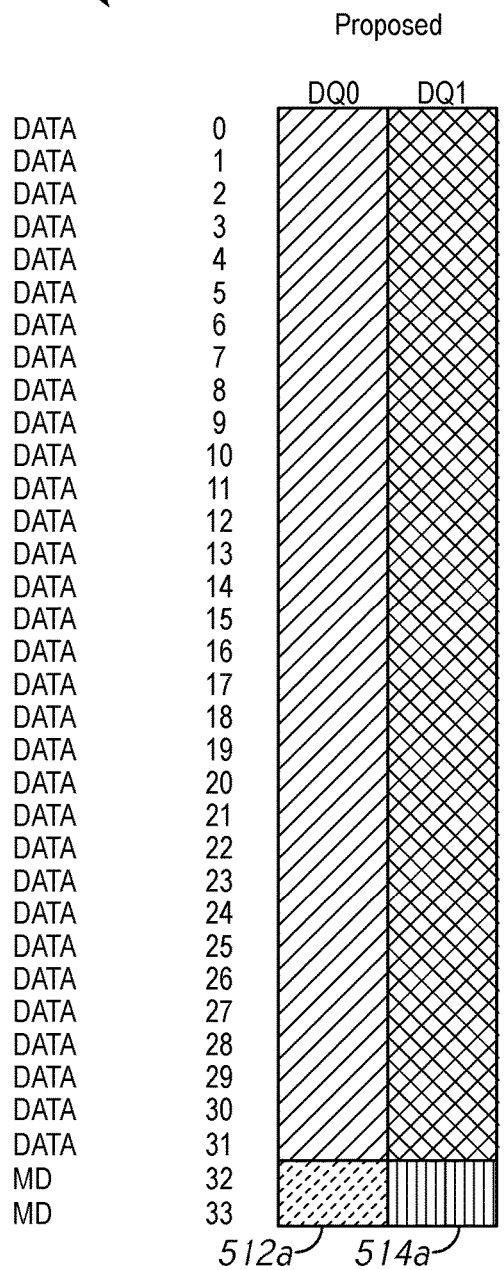
FIGS. 5A and 5B are block diagrams of data and metadata bursts in a 5×2p4 architecture with 4 bytes of metadata or 8 bytes of metadata respectively according to some embodiments of the present disclosure.
Figure 5B:
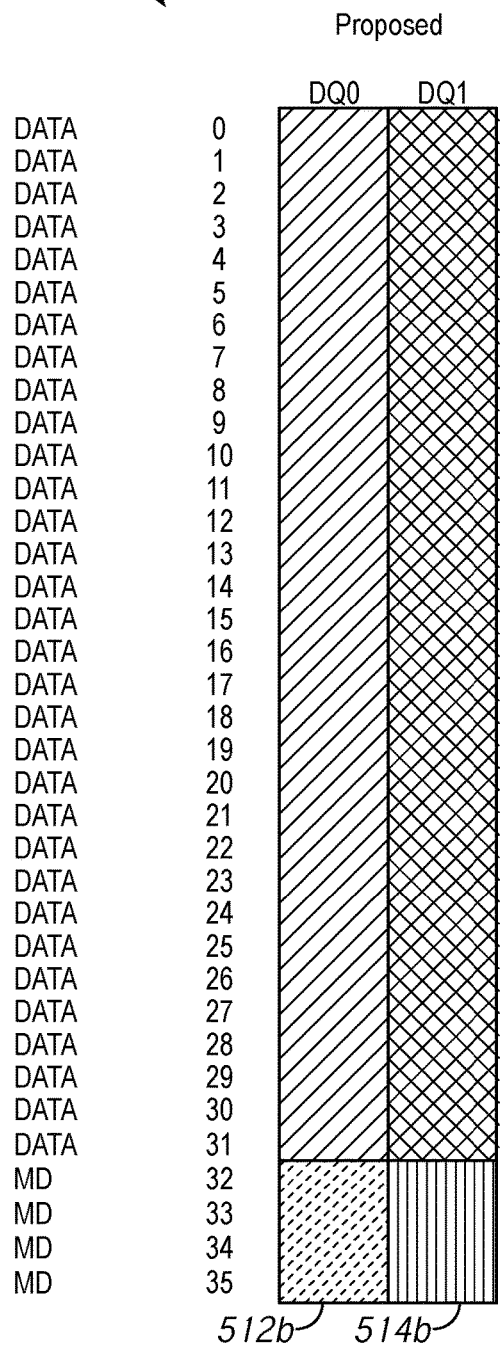

FIGS. 5A and 5B are block diagrams of data and metadata bursts in a 5×2p4 architecture with 4 bytes of metadata or 8 bytes of metadata respectively according to some embodiments of the present disclosure. The diagrams 500a and 500b represents how data and metadata may be split across multiple terminals. For example, the diagrams 500a and 500b may represent how data and metadata are transmitted across DQ terminals such as the DQ terminals 124 of FIG. 1 in a pseudo-channel (e.g., 122 of FIG. 1). The diagram 500a shows an embodiment where 4 B of metadata (across the devices of the module) are used, while the diagram 500b shows an embodiment where 8 B of metadata are used.

The diagrams 500a and 500b shows two DQ terminals (e.g., 124(0) to 124(1) of FIG. 1) which are part of a same pseudo-channel, each of which handles a burst of data and metadata. In the embodiment of FIG. 5A, a burst length of 34 bits is used, 32 data bits and 2 metadata bits for each of the two DQ terminals. In the embodiment of FIG. 5B, a burst length of 36 bits is used 32 data bits and 4 metadata bits for each of the two DQ terminals.

The metadata may be split into two portions of metadata, a first portion 512 and a second portion 514. Each of the two portions 512 and 514 may be stored in different locations within the memory array which are remote from each other. For example, the metadata 512a or 512b which is sent/received along the first DQ terminal DQ0 is stored in a first location, while the metadata 514a or 514b which is sent/received along the second DQ terminal DQ1 is stored in a second location. The portions may be divided between the two DQ terminals because the error correction memory (e.g., 110) on the module (e.g., 102 of FIG. 1) may enable the repairing up to one DQ terminals worth of information.

Figure 6:
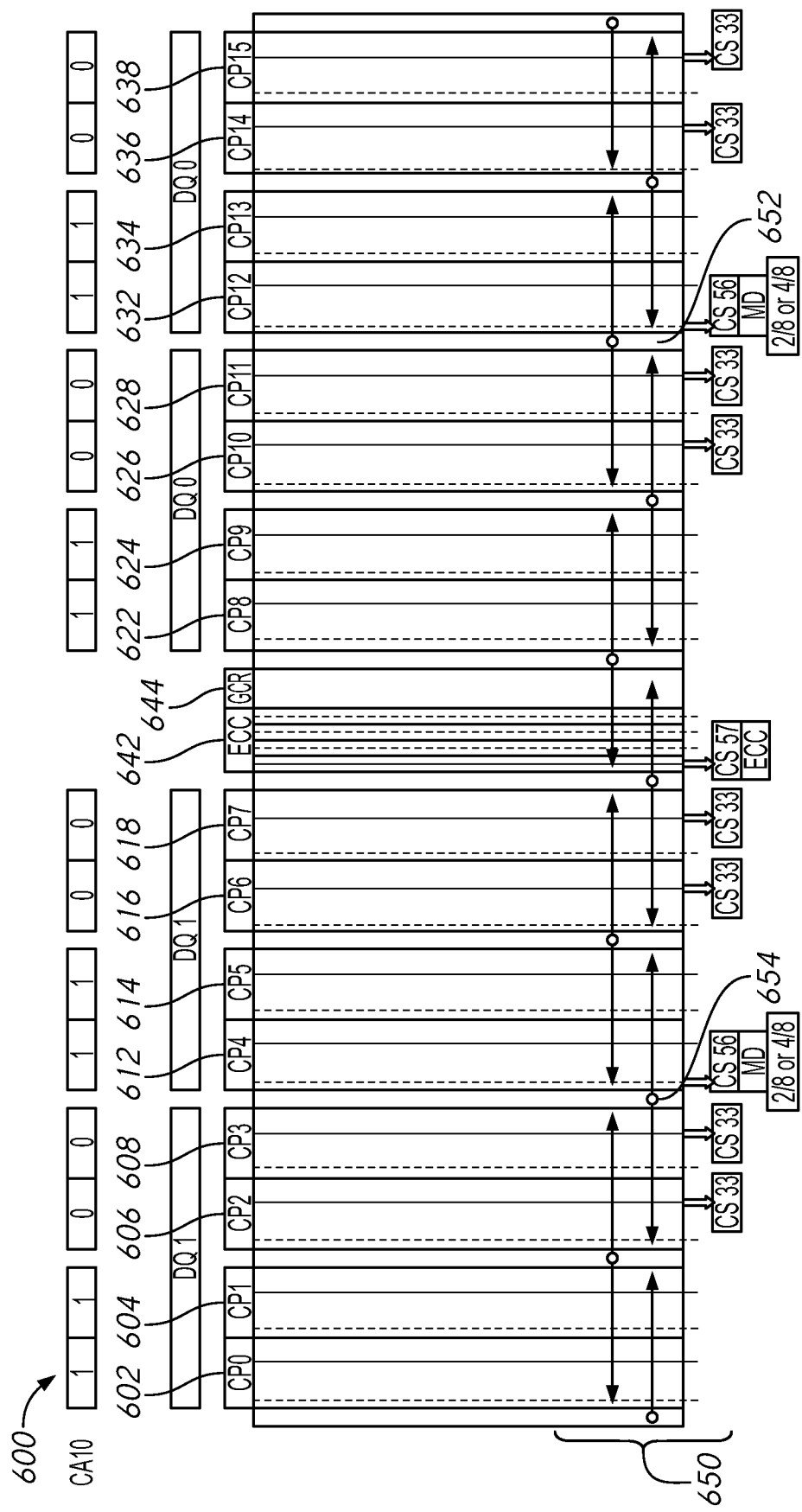
FIG. 6 is a block diagram of a memory array according to some embodiments of the present disclosure.

FIG. 6 is a block diagram of a memory array according to some embodiments of the present disclosure. The memory array 600 may represent the memory array in a memory device (e.g., 104 of FIG. 1) in a memory module (e.g., 102 of FIG. 1) which uses a 9×2p2 architecture with 4 or 8 bytes of metadata. For example, the memory array 600 may implement the memory array 218 of FIG. 2 and/or the column planes 310-314 of FIG. 2.

In the example implementation of FIG. 6, the memory is split into sixteen data column planes 602-638 (e.g., 310 of FIG. 3). In addition there is an extra column plane 642 (e.g., 312 of FIG. 3) used for parity information and a global column repair (GCR) column plane 644 (e.g., 314 of FIG. 3) used for repairs. Each of the column planes 602-638 includes a number of bit lines, organized into sets of 8 bit lines each accessed responsive to a value of a CS signal.

In an example access operation, a read or write signal may be received, for example from a controller (e.g., 150 of FIG. 1) external to the memory module. The memory may perform a single access operation, for example by issuing internal read or write commands along with values of the column select signal from a column decoder (e.g., 210 of FIG. 2). FIG. 6 shows an example mapping of where data, parity, and metadata associated with a received column address may be stored in the array 600. However other mappings may be used in other example embodiments.

As shown in FIG. 6, the different column planes may each be associated with a value of the column plane select bit in the column address. In the example of FIG. 6, the column address bit CA10 may be used to select the column planes. Accordingly, the column planes 602, 604, 612, 614, 622, 624, 632, and 634 are all selected when CA10 is a logical high (e.g., '1'). The column planes 606, 608, 616, 618, 626, 628, 636, and 638 are all selected when CA10 is a logical low (e.g., '0'). Other distributions of how different selected planes are grouped together, which bit is used for selection, how many bits are used for selection, etc., may be used in other example embodiments.

In an example write operation, a row address and column address are received. Responsive to the row address, sub word line drivers 650 are activated to power the conductive elements which make up the physical word line. For the sake of clarity, only a single word lines worth of sub-word line drivers 650 are shown. An ECC circuit, not shown in FIG. 6, such as 220 of FIGS. 2 and/or 332 of FIG. 3 generates parity bits based on the received data and metadata bits. During the access pass, the column decoder provides the column select signal, in this example with a value of CS 33, based on the received column address. This activates a set of 8 bit lines in each of the column planes which are selected by the column plane select bit, in this case column planes 606, 608, 616, 618, 626, 628, 636, and 638 (if a repair has been performed, also in GCR column plane 644). Eight data bits each are written to the memory cells at the intersection of the bit lines selected by CS33 and the active word line in the selected column planes.

Data from different bursts received across the different DQ terminals (e.g., as described in FIG. 5) may go to different column planes. For example, the data from DQ1 may be stored in column planes CP0-CP7 602-618, while data from DQ0 may be stored in CP8 to CP15 622 to 638.

During the same access pass, the metadata is stored in two different column planes which are not selected by the column plane select bit (e.g., in this example two of column planes 602, 604, 612, 614, 622, 624, 632, and 634). In this example, the column decoder provides the CS signal with a value of CS56 to the column planes CP4 612 and CP12 632. The metadata may be split into two portions (e.g., 512a/b and 514a/b of FIGS. 5A and 5B). Depending on the embodiment either two or four bits are written to each of the two locations. For example in a 4 B embodiment, two bits are written to each location, while in an 8 B embodiment, four bits are written to each location. The two column planes 612 and 632 may be coupled to different sub-word line drivers 654 and 652 respectively.

In some embodiments, since fewer than eight bits of metadata are written to each of the two selected column planes 612 and 632, a scheme may be used to protect the bits along the other bit lines associated with the CS value which are not being overwritten. For example, the bit lines may alternate between being coupled to different read/write gaps of the memory array (e.g., an even write game and an odd write gap). The two read/write gaps may be activated by separate write enable signals. This may allow for only half the bit lines associated with the CS value to be active at a time, which may protect the data along the non-selected bit lines. This may be useful for the 8 B embodiment. In an 4 B embodiment, additional write enable signals may be used such that pairs of bit lines are separately enabled such that only two are active when metadata is being written.

In some embodiments, rather than using separate write enable signals, the memory 600 may use a read/modify/write (RMW) cycle to protect the non-written bits in the metadata CS sets. For example, as part of an RMW cycle, all 8 bits may be read out, from both of the two locations (e.g., 16 bits total) and then the selected bits may be modified to be overwritten with the new metadata bits before the modified bits are written back.

As part of the same access pass, the parity bits generated by the ECC circuit may also be written to the memory array. In the example shown in FIG. 6, the parity bits are written to the extra column plane 642 (here labeled the ECC column plane). The column decoder generates a CS signal with a value of CS57 and the parity bits (e.g., 8 parity bits) are written to the memory cells at the intersection of the active word line and the bit lines activated by CS57 in the extra column plane 642. However, based on the column address, the parity bits may be written to one of the data column planes 602-638 instead. For example, the column decoder may provide CS57 (or some other CS value) and the parity bits may be written to memory cells in one of the non-selected column planes which is not being used for metadata (e.g., 602, 604, 614, 622, 624, or 634).

Figure 7:
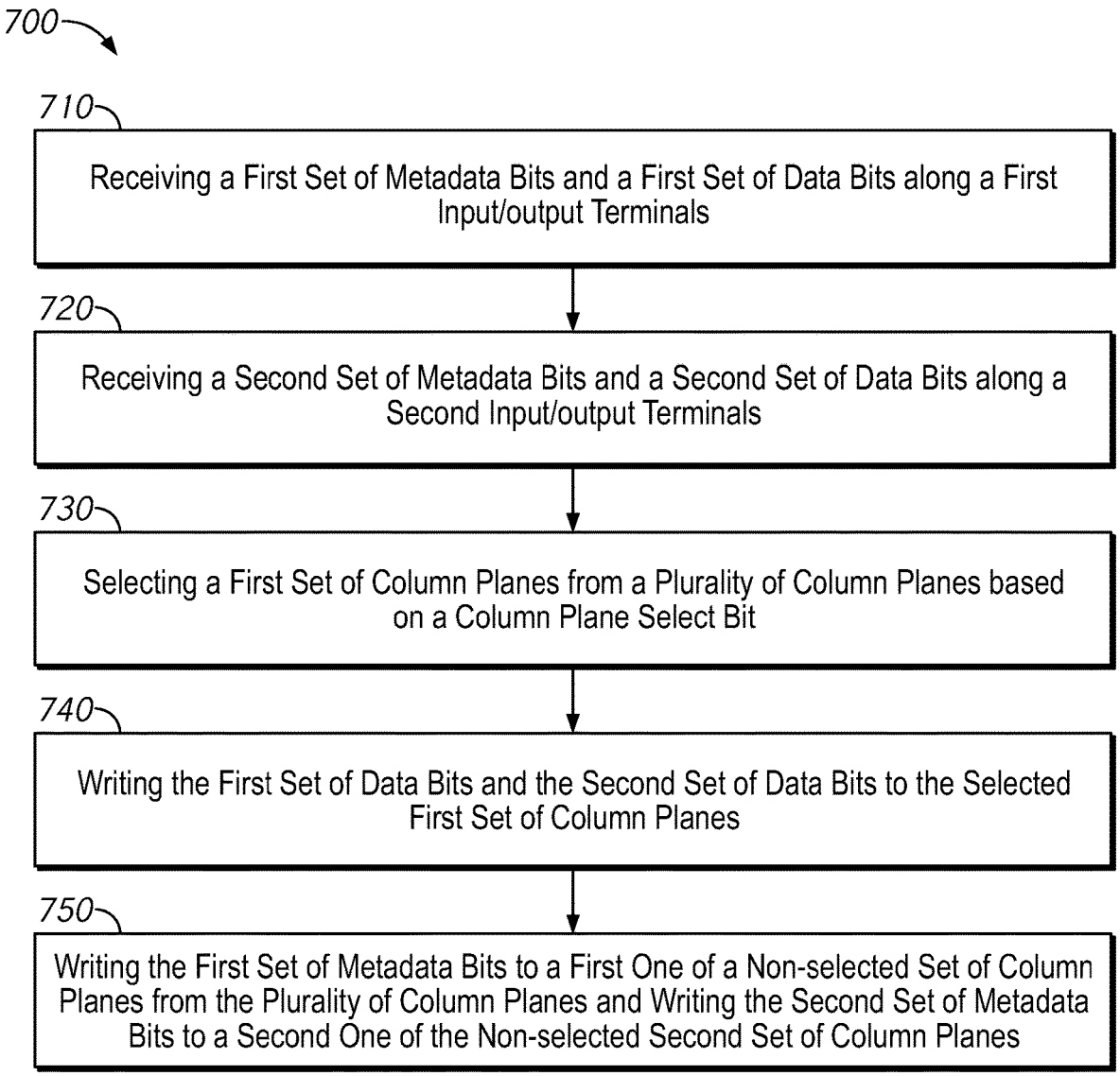
FIG. 7 is a flow chart of a method according to some embodiments of the present disclosure.

FIG. 7 is a flow chart of a method according to some embodiments of the present disclosure. The method 700 may represent an example implementation of the method 400 of FIG. 4 for a 9×2p2 memory architecture with 4 bytes or 8 bytes of metadata enabled. The method 700 may, in some embodiments, be implemented by any of the apparatuses, systems, or parts thereof described herein. For example, the method 700 may be implemented by one of the memories 104 of FIG. 1, the memory 200 of FIG. 2, 300 of FIG. 3, and/or 600 of FIG. 6.

The method 700 represents a write operation performed by a memory device, for example responsive to a write command received from a controller. For example, the method 700 may include sending a write command (e.g., along a C/A bus) to a memory module (e.g., 102 of FIG. 1) along with row and column addresses.

The method 700 includes box 710 which describes receiving a first set of metadata bits and a first set of data bits along a first input/output terminal and box 720 which describes receiving a second set of metadata bits and a second set of data bits along a second input/output terminal. The boxes 710 and 720 may describe receiving bursts such as the burst diagram 500 of FIG. 5. The first set of metadata bits may be 2 metadata bits received across the first DQ terminal and the second set of metadata bits may be 2 metadata bits received across the second DQ terminal in a 4 B embodiment. In an 8 B embodiment, the first set of metadata may be 4 metadata bits received across the first DQ terminal and the second set of metadata bits may be 4 metadata bits received across the second DQ terminal. In either embodiment, the first and the second set of data bits may each include 32 data bits.

The method 700 includes box 730, which describes selecting a first set of column planes from a plurality of column planes based on a column plane select bit. For example, a bit of the column address (e.g., CA10) may act as the column plane select bit. The column plane select bit may select a first set of column planes or a second set of column planes. For example, a first half or a second half of the column planes as described with respect to FIG. 6.

The method 700 includes box 740, which describes writing the first set of data bits and the second set of data bits to the selected first set of column planes. For example, the method 700 may include activating a row based on the received row address. Activating the row may include activating a number of sub-word line drivers. The method may also include providing a first column select signal value from a column decoder (e.g., 210 of FIG. 2) to activate a number of bit lines in each of the column planes and writing the first and the second set of data bits to memory cells at the intersection of the active word line and the active bit lines in the selected first set of column planes.

The method also includes box 750, which describes writing the first set of metadata bits to a first one of a non-selected second set of column planes from the plurality of column planes and writing the second set of metadata bits to a second one of the non-selected second set of column planes. For example, the method 700 may include generating a second column select signal value and activating bit lines in the first and the second ones of the non-selected second set of column planes based on the second column select signal value. For example, the method 700 may include writing two bits of metadata or four bits of metadata from the first DQ terminal to the first one of the non-selected second set of column planes and two or four bits of metadata from the second pair DQ terminal to the second one of the non-selected second set of column planes. The two column planes (e.g., 612 and 632) in the non-selected set may be remote from each other. For example, the two column planes may be coupled to separate sub-word line drivers along the same word line.

In some embodiments, the number of metadata bits written to each column plane may be less than the number of bit lines which are normally activated by a value of the column select signal. The method 700 may include providing a write enable signal only to the bit lines which are going to receive the metadata bits in the respective selected column planes. For example, a first write enable signal may activate even bit lines while a second write enable signal may activate odd bit lines. The data may be written to the selected column planes using both write enable signals. In some embodiments, the method 700 may include performing a read/modify/write operation to write the metadata bits to the first and second one of the non-selected second set of column planes.

In some embodiments, the method 700 may include generating a number of parity bits (e.g., 8 parity bits) based on the first, the second set of data bits, the first set of metadata bits and the second set of metadata bits. The method 700 may include writing the number of parity bits to the array based on a third value of the CS signal. The third value may be match one of the first or the second CS values, or may be different from either. Based on the column address, the method 700 may include writing the parity bits to an extra column plane (e.g., 312 of FIG. 2) or to a third one of the non-selected second set of column planes based on the third CS value and the active word line.

A read operation may also be performed to retrieve the data and the metadata. In the read operation, the order of the two access passes may be reversed, and the metadata may be read first and stored and then the data and metadata may be read out. The read operation may include detecting and/or correcting errors in the data and the metadata based on the parity bits.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above-discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:
1. An apparatus comprising:
 a first data terminal configured to receive a first portion of a plurality of data bits and a first portion of a plurality of metadata bits;

a second data terminal configured to receive a second portion of the plurality of data bits and a second portion of the plurality of metadata bits;

a column decoder configured to select a first portion or a second portion of a plurality of column planes based on a column address; and a memory array comprising:
 a first column plane configured to store the first portion of the plurality of metadata bits; and
 a second column plane configured to store the second portion of the plurality of metadata bits, wherein the first column plane and the second column plane are in the non-selected one of the first portion or the second portion of the plurality of a column planes.

2. The apparatus of claim 1, wherein the first column plane and the second column plane are not coupled to a same sub-word line driver.

3. The apparatus of claim 1, wherein the plurality of data bits are stored in the selected one of the first portion or the second portion of the plurality of column planes.

4. The apparatus of claim 1, further comprising:
 an error correction code (ECC) circuit configured to generate a plurality of parity bits based on the plurality of data and metadata bits,
 wherein the memory array further comprises:
  an extra column plane; and
  a third column plane in the non-selected one of the first or the second portion of column planes, wherein the plurality of parity bits are stored in the extra column plane or the third column plane.

5. The apparatus of claim 1, wherein the column decoder is configured to select the first portion or the second portion of the plurality of column planes based on a column plane select bit included in the column address.

6. The apparatus of claim 1, wherein the column decoder is configured to provide a column select signal with a first value to the selected one of the first portion or the second portion of the plurality of column planes and configured to provide the column select signal with a second value to the non-selected one of the first portion or the second portion of the plurality of column planes.

7. The apparatus of claim 1, wherein the apparatus is a memory device on a memory module configured to operate in a 9×2p2 configuration.

8. A memory module comprising:
 an error correction memory device;
 a plurality of pseudo-channels, each pseudo-channel comprising:
 a first data terminal; and
 a second data terminal; and
 a plurality of memory devices, each associated with at least one of the plurality of pseudo channels, each of the plurality of memory devices comprising a first portion and a second portion of a plurality of column planes,
 wherein during a write operation to a selected one of the plurality of memory devices, an associated one of the pseudo-channels is configured to receive a first portion of a plurality of a data bits and a first portion of a plurality of metadata bits along the first data terminal and to receive a second portion of the plurality of data bits and a second portion of the plurality of metadata bits,
 wherein the plurality of data bits are written to a selected one of the first portion or the second portion of the plurality of column planes,
 wherein the first portion of the plurality of metadata bits is written to a first location in a non-selected one of the first portion or the second portion of the plurality of column planes, and
 wherein the second portion of the plurality of metadata bits is written to a second location in the non-selected one of the first portion or the second portion of the plurality of column planes.

9. The memory module of claim 8, wherein the first and the second location are remote from each other.

10. The memory module of claim 8, wherein the memory module is configured in a 9×2p2 configuration.

11. The memory module of claim 8, wherein the error correction memory device is configured to enable correction of up to one of the first data terminal or the second data terminal in one of the plurality of pseudo-channels.

12. The memory module of claim 8 wherein each of the plurality of memory devices comprises a column decoder configured to provide a first value of a column select signal to the selected one of the first portion or the second portion of the plurality of the plurality of column planes and configured to provide a second value of the column select signal to the non-selected one of the first portion or the second portion of the plurality of the plurality of column planes.

13. The memory module of claim 8, wherein the selected one of the first portion or the second portion of the plurality of the plurality of column planes is selected based on a column plane select bit in a column address.

14. A method comprising:
 receiving a first set of metadata bits and a first set of data bits along a first data terminal;
 receiving a second set of metadata bits and a second set of data bits along a second data terminal;
 selecting a first set of column planes from a plurality of column planes based on a column plane select bit;
 writing the first set of data bits and the second set of data bits to the selected first set of column planes; and
 writing the first set of metadata bits to a first one of a non-selected second set of column planes from the plurality of column planes and writing the second set of metadata bits to a second one of the non-selected second set of column planes.

15. The method of claim 14, further comprising:
 providing a first column select signal value to the selected first set of column planes; and
 providing a second column select signal value to the non-selected second set of column planes.

16. The method of claim 15, wherein the first one and the second one of the non-selected second set of column planes are remote from each other.

17. The method of claim 14, further comprising:
 activating a first sub-word line driver which is associated with the first one of the non-selected second set of column planes; and
 activating a second sub-word line driver which is associated with the second one of the non-selected second set of column planes.

18. The method of claim 14, further comprising:
 generating a plurality of parity bits based on the first set of data bits, the second set of data bits, the first set of metadata bits and the second set of metadata bits; and
 writing the plurality of parity bits to an extra column plane or to a third one of the non-selected second set of column planes.

19. The method of claim 14, wherein the plurality of column planes are part of a memory device on a memory module configured in a 9×2p2 configuration.

20. The method of claim 14, further comprising:
- providing a column select signal to the first one of the non-selected second set of column planes and the second one of the non-selected second set of column planes, wherein the column select signal is associated with a first number of bit lines in the first one and the second one of the non-selected second set of column planes; and
- providing a write enable signal to a portion of the first number of bit lines in the first one and the second one of the non-selected second set of column planes.

\* \* \* \* \*